United States Patent
Yamaji

(10) Patent No.: US 8,933,999 B2
(45) Date of Patent: Jan. 13, 2015

(54) STEREOSCOPIC IMAGE DISPLAY CONTROL APPARATUS, AND METHOD AND PROGRAM FOR CONTROLLING OPERATION OF SAME

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 810 days.

(21) Appl. No.: 13/218,911

(22) Filed: Aug. 26, 2011

(65) Prior Publication Data
US 2012/0056882 A1 Mar. 8, 2012

(30) Foreign Application Priority Data
Sep. 6, 2010 (JP) .................................. 2010-199026

(51) Int. Cl.
H04N 13/00 (2006.01)
(52) U.S. Cl.
CPC .................................. *H04N 13/0022* (2013.01)
USPC ................... 348/51; 348/42; 348/43; 348/44; 348/45; 348/46; 348/47; 348/48; 348/49; 348/50; 348/52; 348/53; 348/54; 348/55; 348/56; 348/57; 348/58; 348/59; 348/60
(58) Field of Classification Search
USPC ..................................................... 348/42–60
See application file for complete search history.

(56) References Cited

U.S. PATENT DOCUMENTS

| | | | | |
|---|---|---|---|---|
| 2005/0089212 A1* | 4/2005 | Mashitani et al. | ............ | 382/154 |
| 2005/0253924 A1* | 11/2005 | Mashitani | ........................ | 348/42 |
| 2006/0290778 A1* | 12/2006 | Kitaura et al. | .................. | 348/51 |
| 2011/0018968 A1* | 1/2011 | Shikata et al. | .................. | 348/47 |
| 2011/0018978 A1* | 1/2011 | Ego | ................. | 348/51 |

FOREIGN PATENT DOCUMENTS

| | | | |
|---|---|---|---|
| JP | 2006-134230 | | 5/2006 |
| JP | 2006134230 A | * | 5/2006 |
| JP | 2008-205203 | | 9/2008 |
| JP | 4259913 | | 4/2009 |
| JP | 2010-045584 | | 2/2010 |
| JP | 2013197797 A | * | 9/2013 |
| WO | WO 2011084021 A2 | * | 7/2011 |

* cited by examiner

*Primary Examiner* — Dave Czekaj
*Assistant Examiner* — Shanika Brumfield
(74) *Attorney, Agent, or Firm* — Young & Thompson

(57) ABSTRACT

Margins are prevented from being produced when the amount of parallax of a stereoscopic image has been enlarged. A parallax adjustment command is applied if a stereoscopic image is displayed in an image compositing area that has been defined on a page constituting an electronic album. The amount of parallax is enlarged in response to application of a command to enlarge the amount of parallax. If enlarging the amount of parallax will cause margins to be produced when the stereoscopic image is displayed in the image compositing area on the page, then this page is replaced by a page on which an image compositing area that will not produce margins has been formed.

8 Claims, 9 Drawing Sheets

LEFT-EYE IMAGE

RIGHT-EYE IMAGE

STEREOSCOPIC IMAGE

AMOUNT OF PARALLAX ENLARGED

AMOUNT OF PARALLAX ENLARGED FURTHER

STEREOSCOPIC IMAGE DISPLAY CONTROL APPARATUS, AND METHOD AND PROGRAM FOR CONTROLLING OPERATION OF SAME

BACKGROUND OF THE INVENTION

1. Field of the Invention

This invention relates to a stereoscopic image display control apparatus and to a method and program for controlling the operation of this apparatus.

2. Description of the Related Art

There is a technique for eliminating a gap between an image and a photo frame when an image is pasted in the photo frame of an electronic album (see Japanese Patent Application Laid-Open No. 2006-134230). Further, since the amount of stereoscopic pop-up (depth perception) of a stereoscopic image is not uniquely decided when a stereoscopic image is displayed, there are techniques for adjusting the amount of pop-up (see Japanese Patent Application Laid-Open Nos. 2010-45584 and 8-205203). Since the amount of pop-up varies depending upon enlargement and reduction of image size, there is a technique for determining whether a changed amount of pop-up falls within parallax limits (see Japanese Patent No. 4259913).

In cases where an image compositing area has been defined, however, problems can arise when a stereoscopic image is pasted in such an image compositing area. No consideration whatsoever has been given to such problems.

SUMMARY OF THE INVENTION

An object of the present invention is to so arrange it that a margins can be eliminated from an image compositing area when a stereoscopic image is displayed in the image compositing area.

A stereoscopic image display control apparatus according to the present invention comprises: a first display control device (first display control means) for controlling a display unit so as to display a first superimposed image portion, which is obtained by superimposing a left-eye image and a right-eye image that constitute a stereoscopic image, in a first image compositing area that has been formed in a first template image; a parallax-amount enlarging device (parallax-amount enlarging means) for enlarging a parallax amount, which is amount of horizontal offset between the left- and right-eye images, in response to a parallax-amount enlarging command; a margin determination device (margin determination means) for determining whether margins will be produced in the first image compositing area in response to enlargement of the parallax amount by the parallax-amount enlarging device; a substituting device (substituting means) for substituting a second template image, in which has been formed a second image compositing area that will not produce margins, for the first template image in response to a determination by the margin determination device that margins will be produced; and a second display control device (second display control means) for controlling the display unit so as to display a second superimposed image portion, which is obtained by superimposing the left-eye image and the right-eye image having the parallax amount that has been enlarged by the parallax-amount enlarging device, in the second image compositing area of the second template image that has been substituted for the first template image by the substituting device.

The present invention also provides an operation control method suited to the above-described stereoscopic image display control apparatus. Specifically, the present invention provides a method of controlling operation of a stereoscopic image display control apparatus, comprising the steps of: controlling a display unit so as to display a first superimposed image portion, which is obtained by superimposing a left-eye image and a right-eye image that constitute a stereoscopic image, in a first image compositing area that has been formed in a first template image; enlarging a parallax amount, which is amount of horizontal offset between the left- and right-eye images, in response to a parallax-amount enlarging command; determining whether margins will be produced in the first image compositing area in response to enlargement of the parallax amount; substituting a second template image, in which has been formed a second image compositing area that will not produce margins, for the first template image in response to a determination that margins will be produced; and controlling the display unit so as to display a second superimposed image portion, which is obtained by superimposing the left-eye image and the right-eye image having the parallax amount that has been enlarged, in the second image compositing area of the second template image that has been substituted for the first template image.

The present invention further provides a computer-readable program for implementing the above-described method of controlling operation of a stereoscopic image display control apparatus. It may also be arranged to provide a recording medium, on which this program has been stored, removably inserted into a computer.

In accordance with the present invention, a first superimposed image portion, which is obtained by superimposing a rectangular left-eye image and a rectangular right-eye image that constitute a stereoscopic image, is displayed in a first image compositing area that has been formed in a first template image. When a parallax-amount enlargement command is applied, this enlarges the amount of parallax, which is the amount of horizontal offset between the left- and right-eye images. If the amount of parallax is enlarged, the width of the superimposed image portion in the horizontal direction decreases. Enlarging the amount of parallax, therefore, causes margins to be produced in the image compositing area. In the present invention, whether margins will be produced in the image compositing area by enlargement of the amount of parallax is determined. If it is determined that margins will be produced, then the first template image is replaced by a second template image in which a second image compositing area that will not produce margins has been formed. A second superimposed image portion, which is obtained by superimposing the left-eye image and the right-eye image having the parallax amount that has been enlarged, is displayed in the second image compositing area of the second template image. This makes it possible to prevent margins from being formed in the image compositing area.

Preferably, the layout of the second template image that has been substituted for the first template image by the substituting device is the same as that of the first template image.

In a case where a plurality of the first image compositing areas have been formed in the first template image, the second image compositing areas that have been formed in the second template image are plural in number and the number is the same as that of the first image compositing areas. In this case, under the control of the first display control device, the second superimposed image portion is displayed in the second image compositing area that corresponds to the first image compositing area in which the first superimposed image portion is displayed.

By way of example, the margin determination device determines that margins will be produced in a case where the transverse width of the first image compositing area is greater than that of the second superimposed image portion.

In a case where the left-eye image, the right-eye image, the first image compositing area and the second image compositing area are all rectangular, the aspect ratio of a portion common to both the second superimposed image portion and first image compositing area is the same as that of the second image compositing area, by way of example.

The apparatus may further comprise a template image data storage device (template image storage means) for storing template image data representing a number of template images in which image compositing areas have been formed. In this case, the parallax-amount enlarging device allows enlargement of parallax amount that will not produce margins in an image compositing area that has been formed in a template image represented by template image data that has been stored in the template image data storage device, by way of example.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail with reference to the drawings.

Figure 1:
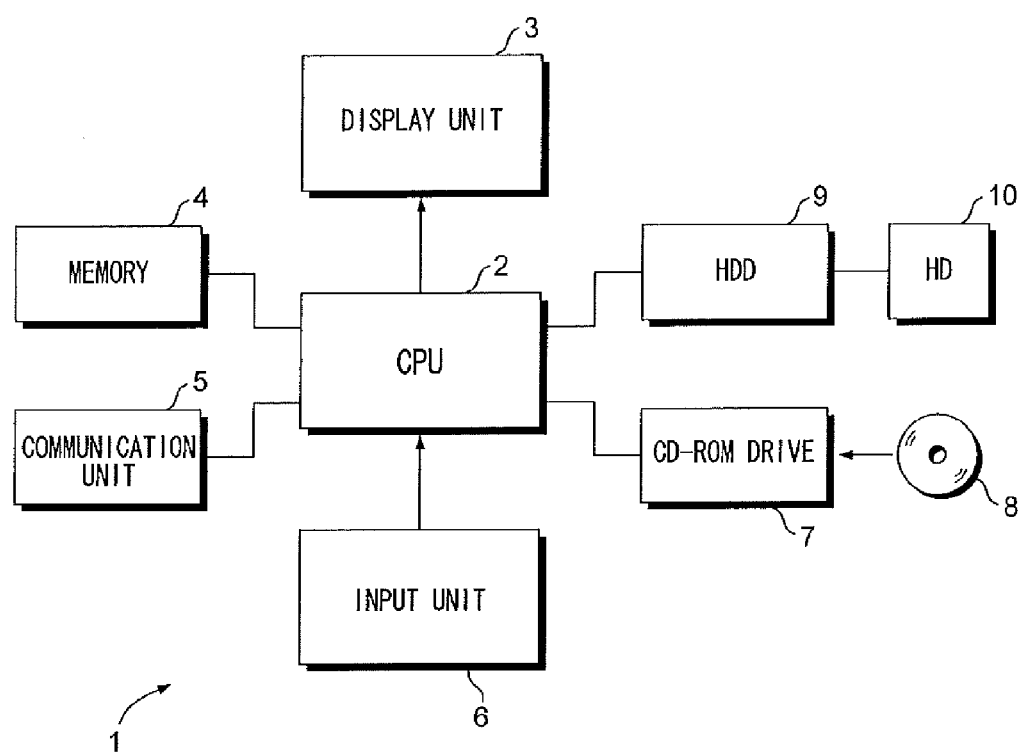
FIG. 1 is a block diagram illustrating the electrical configuration of a personal computer.

FIG. 1 is a block diagram illustrating the electrical configuration of a personal computer 1 according to an embodiment of the present invention. In this embodiment, the personal computer 1 communicates with a server computer (not shown) via the Internet. While communicating with the server computer, the user creates an electronic album using the personal computer 1. Naturally, the user may generate an electronic album without communicating with the server computer and is also capable of generating an electronic album utilizing a store terminal, which has been installed at a supermarket or convenience store, etc., without using the personal computer 1. In this case, the store terminal would have the electrical configuration shown in FIG. 1.

The overall operation of the personal computer 1 is controlled by a CPU 2.

The personal computer 1 includes a display unit 3, a memory 4, a communication unit 5 for communicating with a server computer, and an input unit 6 such as a keyboard and mouse. The personal computer 1 includes a hard disk 10 on which data such as image data representing a number of images has been recorded, and a hard-disk drive 9 for accessing the hard disk 10. The personal computer 1 further includes a CD-ROM drive 7 that accesses a CD-ROM 8 in which has been stored a program for controlling operation described below. The program that has been stored in the CD-ROM 8 is read by the CD-ROM drive 7 and the read program is installed in the personal computer 1, thereby allowing the personal computer 1 to operate in the manner described below. Naturally, it may be so arranged that even if the operation program is not stored on a recording medium such as the CD-ROM 8 removably inserted into the personal computer 1, the program can still be downloaded to the personal computer 1 via a network and installed in the personal computer 1.

Figure 2:
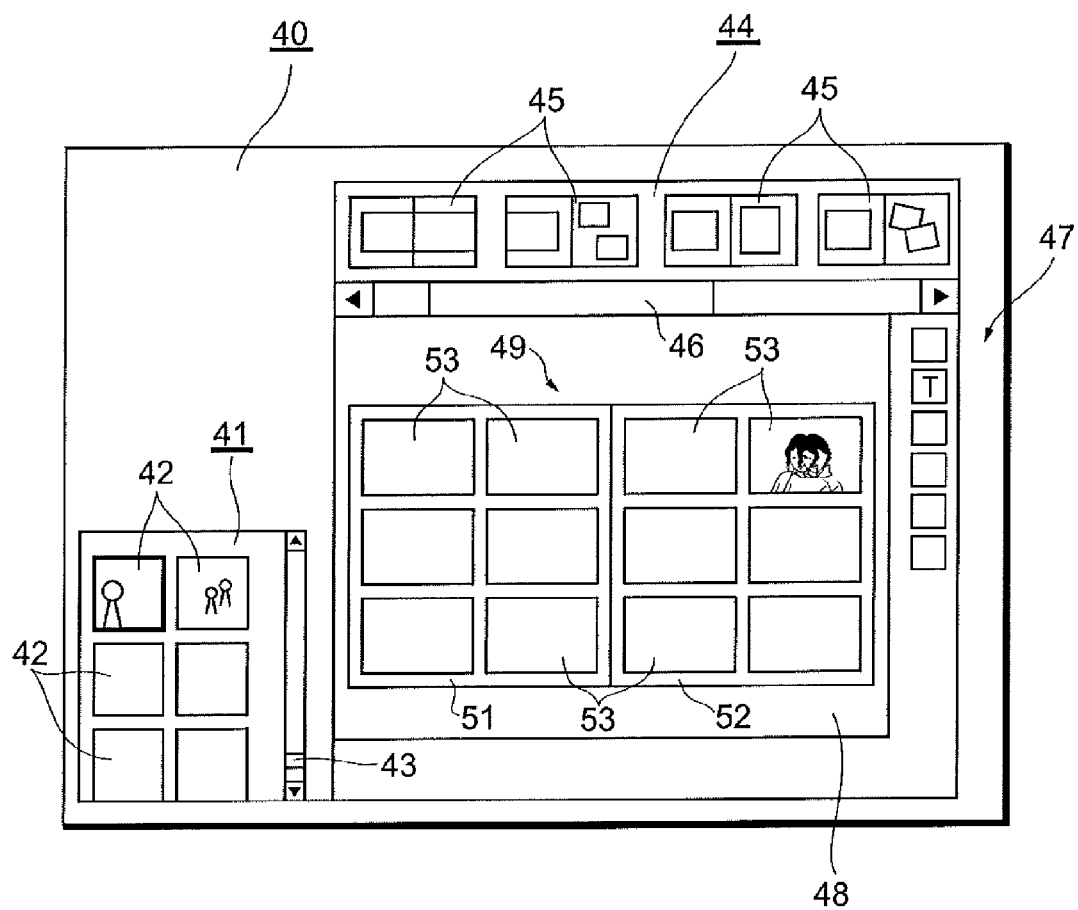
FIG. 2 is an example of a window for editing an electronic album.

FIG. 2 is an example of a window 40 for editing the electronic album.

Although processing for generating the electronic album will be described below, it will be assumed here that the personal computer 1 has already been connected to a server computer and that the electronic-album editing window 40 shown in FIG. 2 is being displayed on the display screen of the display unit 3 of the personal computer 1.

Formed at the lower-left portion of the editing window 40 is an image display area 41 in which images 42 to be pasted into the electronic album are displayed. The images (user images) 42 being displayed in the image display area 41 are represented by image data that has been stored on the hard disk 10. In a case where the electronic album is created using a store terminal, it goes without saying that the user brings a recording medium such as a memory card on which the image data has been recorded, reads the image data from the recording medium and displays the images, which are represented by the read image data, in the image display area 41. In such case the store terminal is provided with a memory card reader. A scroll button 43 is formed on the right side of the image display area 41. The scroll button 43 is moved freely up and down by a cursor (not shown). By moving the scroll button 43 up or down by the cursor, images that do not appear in the image display area 41 come into view in the image display area 41.

In this embodiment, stereoscopic images can be displayed in the electronic album, as will be described later in detail. The images 42 being displayed in the image display area 41 also are stereoscopic images. With regard to the images 42 being displayed in the image display area 41, amount of parallax (described later) can be enlarged and reduced freely. On the other hand, with regard to stereoscopic images displayed in image compositing areas 53 that have been formed in an image 49 of a page (template) displayed in an editing area 48 (described next), when it is determined that margins will be produced in the image compositing areas 53 in conformity with enlargement of the amount of parallax, this image 49 is replaced with the image 49 of a page having image compositing areas 53 in which margins will not be produced.

Formed at the upper portion of the editing window 40 is a page display area 44 in which images 45 of pages (templates) constituting an electronic album are displayed. A scroll button 46 is formed beneath the page display area 44. The scroll button 46 also is freely movable to the left and right by a cursor (not shown). By moving the scroll button 46 to the left or right using the cursor, the images of pages that do not appear in the page display area 44 come into view in the page display area 44.

The editing area 48, which is for editing the pages that constitute the electronic album, is formed substantially over the entirety of the editing window 40. If the image of a desired page is selected (as by drag and drop) from among the images of the pages being displayed in the page display area 44, the image 49 of the selected page will be displayed in the editing area 48. Multiple (or a single) rectangular image compositing areas 53 (though they need not necessarily be rectangular) are defined in each of a left-side page 51 and right-side page 52 of the image 49 of the selected pages. Images constituting the electronic album are pasted in the image compositing areas 53. For example, pasting of a desired image in a desired image compositing area 53 from among the images 42 being displayed in the image display area 41 is achieved by dragging and dropping the desired image in this image compositing area 53. Formed on the right side of the editing window 40 are editing buttons 47 for synthesizing text, deleting images and subjecting images to a color conversion. As mentioned above, an image that is pasted in the image compositing area 53 is a stereoscopic image. Enlargement of the amount of parallax of this stereoscopic image also is performed using the editing buttons 47.

Figure 3:
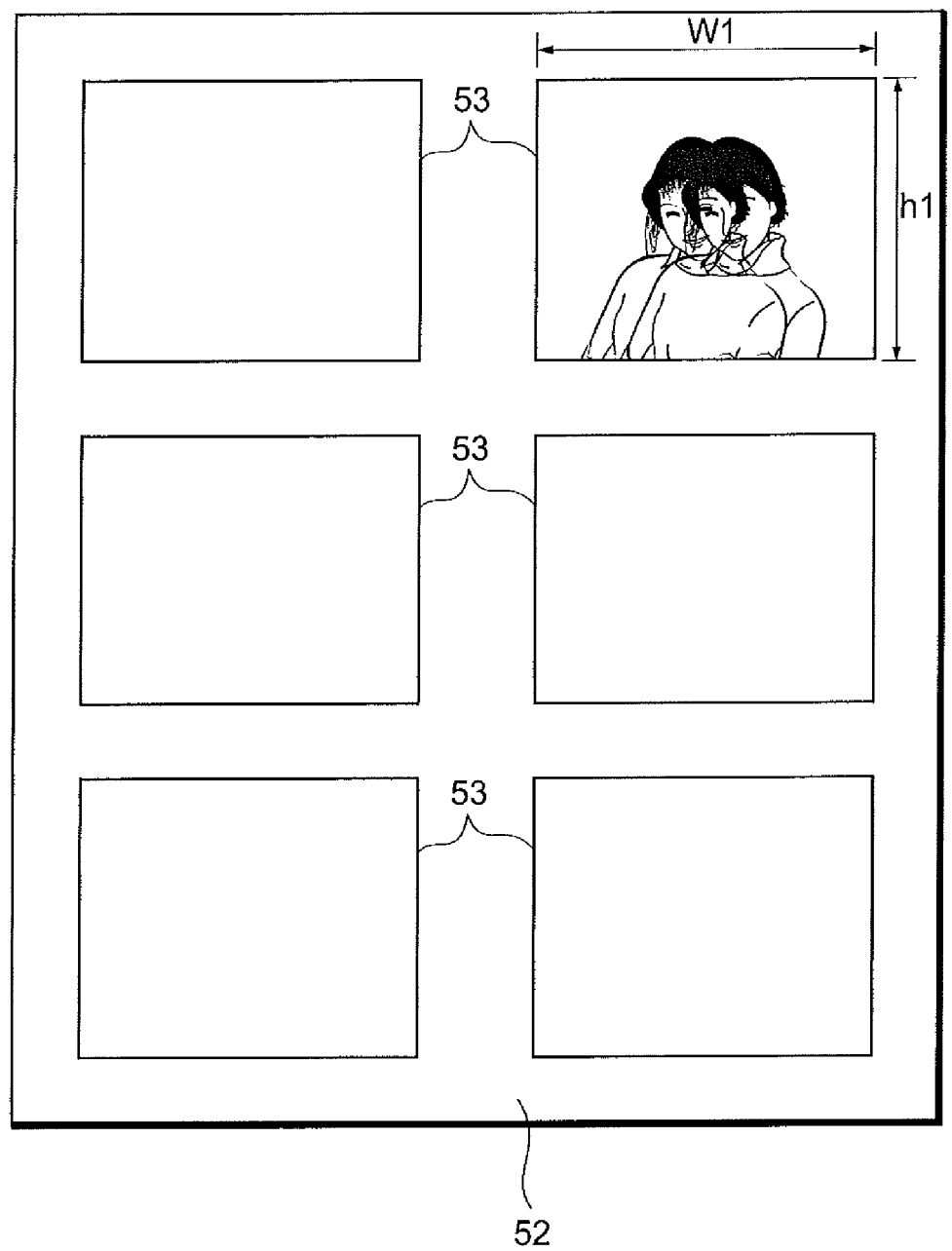
FIG. 3 is an example of an image of a page constituting an electronic album.

FIG. 3 illustrates the right-side page 52, which is being displayed in the editing area 48 of editing window 40, in a form enlarged in comparison with FIG. 2.

Thus, a plurality of the image compositing areas 53 consisting of three rows and two columns are formed on the page 52 constituting the electronic album. These image compositing areas 53 have been laid out so as to be spaced apart equally in the vertical direction and equally in the horizontal direction. The plurality of image compositing areas 53 all are identical in size and have an aspect ratio of w1 (transverse width):h1 (height).

Images are pasted in these image compositing areas 53. In particular, in this embodiment, stereoscopic images are pasted in the image compositing areas 53. The user can thus produce an electronic album of stereoscopic images.

Figure 4:
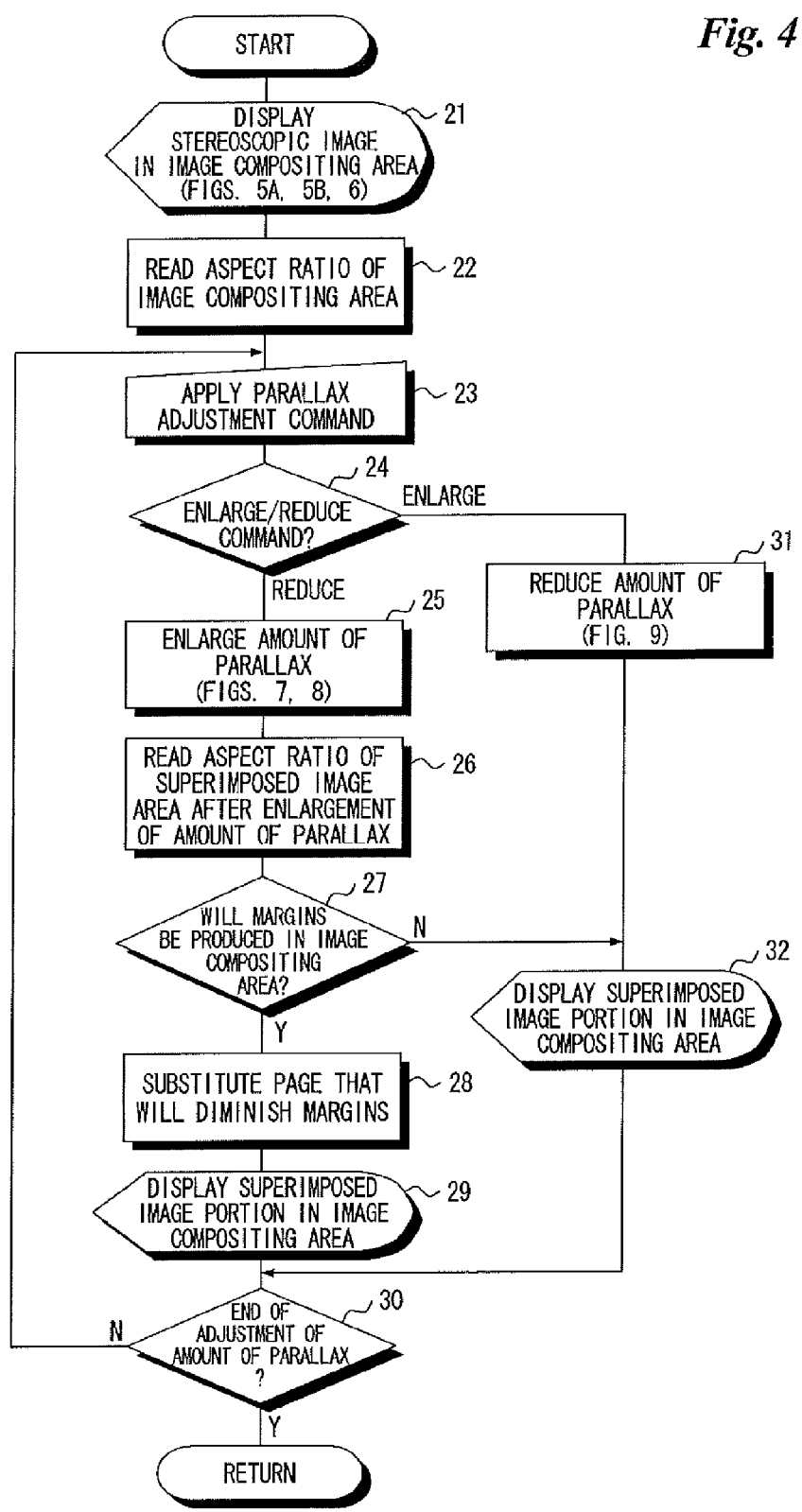
FIG. 4 is a flowchart illustrating processing for generating an electronic album.

FIG. 4 is a flowchart illustrating processing for generating an electronic album.

In this embodiment, a stereoscopic image is pasted (displayed) in an image compositing area 53 and the amount of parallax of the pasted stereoscopic image can be enlarged and reduced. In the event that margins will be produced in the image compositing area 53, as will be described later, when the amount of parallax is enlarged, a page in which an image compositing area that will not produce margins has been formed is substituted.

A desired image 42 is selected from among the images 42 being displayed in the image display area 41. The image 42 selected is pasted in a desired image compositing area 53. When this is done, the stereoscopic image of the selected image 42 is displayed in the image compositing area 53 (step 21).

Figure 5A:
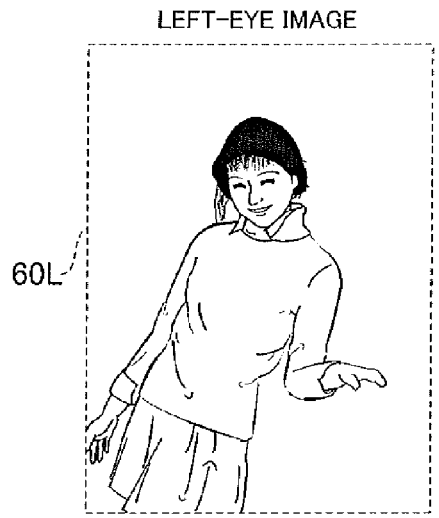
FIGS. 5A and 5B illustrate a left-eye image and a right-eye image, respectively.
Figure 5B:
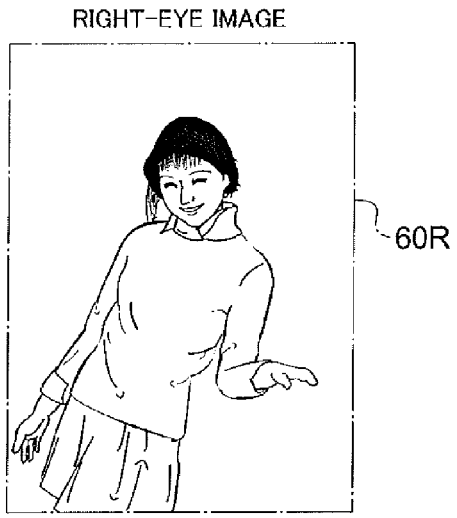

FIG. 5A illustrates a rectangular left-eye image 60L and FIG. 5B illustrates a rectangular right-eye image 60R.

In a case where a stereoscopic image is displayed, the left-eye image 60L, which is observed by the left eye of the observer, and the right-eye image 60R, which is observed by the right eye of the observer, are required. In this embodiment, therefore, the left-eye image 60L and right-eye image 60R have been stored beforehand as the images desired to be displayed in the form of a stereoscopic image in the image compositing area 53. The left-eye image 60L and right-eye image 60R need not necessarily be rectangular.

Figure 6:
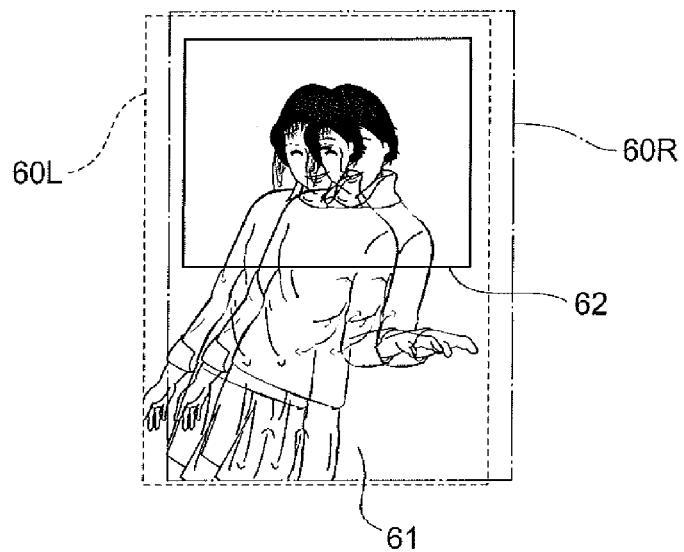
FIG. 6 illustrates an example of a stereoscopic image.

FIG. 6 illustrates a stereoscopic image.

If the left-eye image 60L and right-eye image 60R are superimposed upon being offset from each other in the horizontal direction (the amount of horizontal offset is the amount of parallax), then the observer can view a portion 61, where the two images have been superimposed, as a stereoscopic image. In this embodiment, an image portion within a zone 62 contained in the superimposed image portion 61 and having the same size as that of the image compositing area 53 is displayed in the image compositing area 53. The image displayed in the image compositing area 53 appears as a stereoscopic image.

With reference again to FIG. 4, the aspect ratio (transverse width:height=w1:h1) of the image compositing area 53 in which the stereoscopic image has been displayed is read (step 22).

Next, a parallax adjustment command is applied by the user (step 23). The editing buttons 47 include a parallax adjustment command button, which is used to apply parallax adjustment commands for enlarging and reducing the amount of parallax.

When a command for enlarging the amount of parallax is applied (step 24), the amount of parallax is enlarged in response to this command (step 25). When the amount of parallax is enlarged, the aspect ratio of the stereoscopic image that will be displayed in the image compositing area 53 after the enlargement of the amount of parallax is read (step 26).

Figure 7:
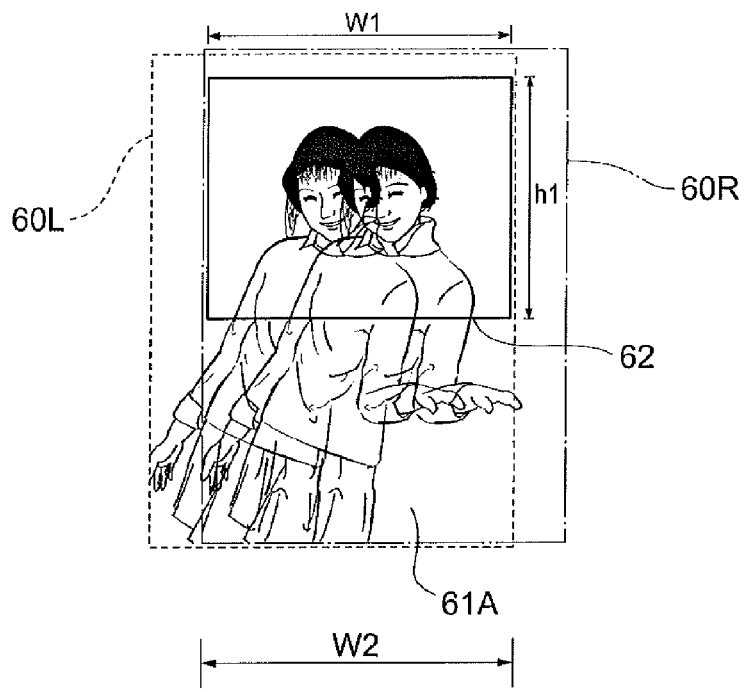
FIG. 7 illustrates the manner in which amount of parallax is enlarged.

FIG. 7 illustrates a stereoscopic image the amount of parallax of which has been enlarged in comparison with the stereoscopic image shown in FIG. 6.

When the parallax-amount enlargement command is applied, the left-eye image 60L and right-eye image 60R are positioned so as to separate from each other in accordance with the amount of enlargement of parallax decided by the enlargement command. When the amount of parallax is enlarged, the width w2 of an image portion 61A where the left-eye image 60L and right-eye image 60R are superposed becomes smaller in comparison with that before the amount of parallax was enlarged.

The stereoscopic image displayed in the image compositing area 53 is a portion common to both the superimposed image portion 61A and the zone 62 corresponding to the image compositing area 53. In the example shown in FIG. 7, the zone 62 falls completely within the superimposed image portion 61A and therefore the image inside the zone 62 is displayed in its entirety in the image compositing area 53. The aspect ratio of the stereoscopic image displayed in the image compositing area 53 is identical with the aspect ratio of the image compositing area 53.

Figure 8:
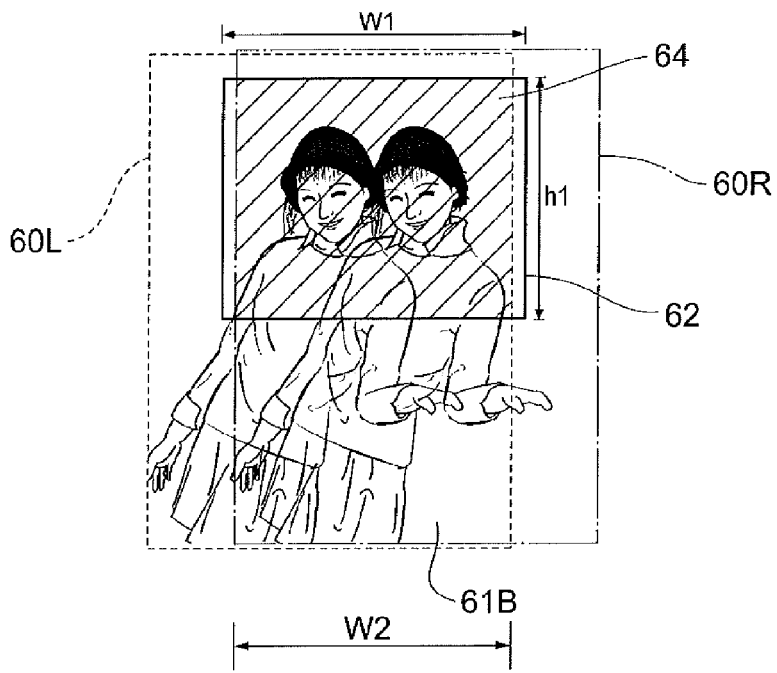
FIG. 8 illustrates the manner in which amount of parallax is enlarged further.

FIG. 8 illustrates a stereoscopic image the amount of parallax of which has been enlarged further in comparison with FIG. 7.

When the amount of parallax is enlarged further, the transverse width w2 of an image portion 61B where the left-eye image 60L and right-eye image 60R are superposed becomes even smaller. As a result, from within the zone 62 corresponding to the image compositing area 53, a common portion (indicated by hatching) 64 contained in the superimposed image portion 61B is displayed in the image compositing area 53. Image portions 63 on both sides of the common portion 64 indicated by the hatching are not displayed in the image compositing area 53. The transverse width of the common portion 64 is the same as the transverse width w2 of the superimposed image portion 61B, and the height of the common portion 64 is h1 since it is unchanged from the height that prevailed before the enlargement of amount of parallax. The aspect ratio is traverse width:height=w2:h1. If the common portion 64 were to be displayed as the stereoscopic image in the image compositing area 53, margins would be formed on both sides of the image compositing area 53.

With reference again to FIG. 4, whether margins will be produced in the image compositing area 53 in a case where the stereoscopic image after enlargement of the amount of parallax thereof is displayed in the image compositing area 53 is determined from the aspect ratio of the image compositing area 53 and the aspect ratio of the stereoscopic image that is displayed in the image compositing area 53 after enlargement of the amount of parallax (step 27). The height of the stereoscopic image is the same before and after enlargement of amount of parallax. Therefore, if the transverse width of the stereoscopic image (the transverse width of the superimposed image portions 61A, 61B, etc.) w2 after enlargement of amount of parallax is less than the transverse width w1 of the image compositing area 53, then it is determined that margins will be formed in the image compositing area 53. If the transverse width w2 of the superimposed image portion 61A prevailing after enlargement of the amount of parallax is equal to or greater than the transverse width of the image compositing area 53, then it is determined that margins will not be produced in the image compositing area 53.

If the amount of enlargement of parallax is small and margins will not be produced in the image compositing area 53 ("NO" at step 27), as illustrated in FIG. 7, then the enlargement command is reflected in the display of the stereoscopic image. The image portion of the zone 62 contained in the superimposed image portion 61A prevailing after enlargement of the amount of parallax is displayed in the image compositing area 53 (step 32). If the adjustment of amount of parallax is not finished ("NO" at step 30), processing from step 23 onward is repeated.

If the amount of enlargement of parallax is large and margins will be produced in the image compositing area 53 ("YES" at step 27), as illustrated in FIG. 8, then the page image 51 is replaced with a page image having an image compositing area in which margins are diminished (and preferably not produced at all) (step 28; replace template).

From among the number of page images that have been stored in the personal computer 1 (or server computer), a page in which an image compositing area having the same aspect ratio (transverse width:height=w2:h1) as that of the stereoscopic image and the same size is substituted for the above-mentioned page image. The layout of the page that is substituted is the same as that of the page before the substitution.

Figure 9:
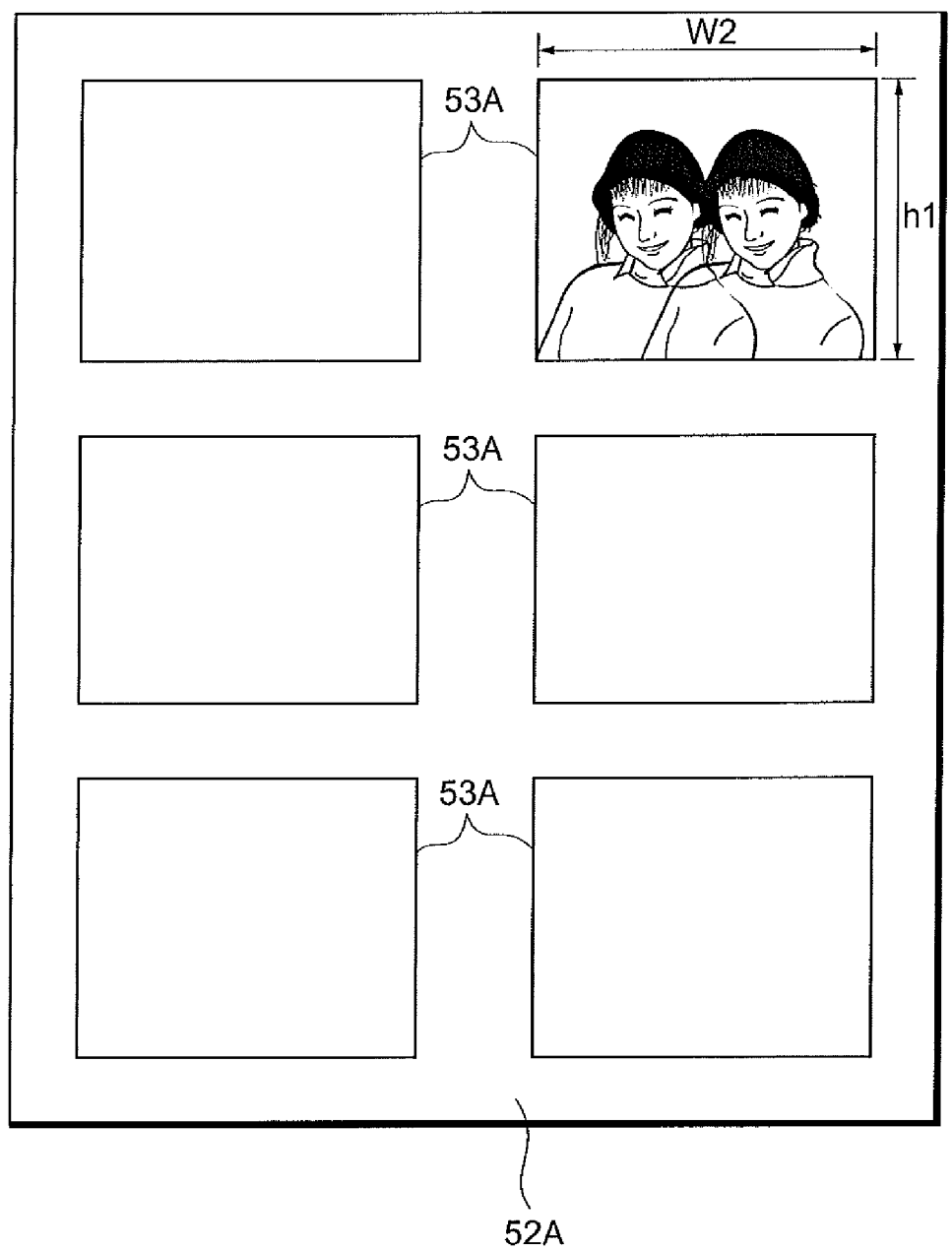
FIG. 9 is an example of an image of a page constituting an electronic album.

FIG. 9 is an example of a substituted page.

Specifically, a page 51A has a layout identical with that of the page 51 before the substitution. Image compositing areas 53A consisting of three rows and two columns are laid out to have equal spacing in the same column and equal spacing in the same row. The number of image compositing areas 53 contained on the page 51 and the number of image compositing areas 53A contained on the page 51A that has been substituted for page 51 are identical. Though it is preferred that the layouts be identical, they need not necessarily be identical. The aspect ratio (transverse width:height=w2:h1) and size of the image compositing areas 53A is equal to the aspect ratio and size of the common portion 64 shown in FIG. 8.

Even if the size of the common portion 64 and the size of the image compositing area are different, if the aspect ratio of the common portion 64 and the aspect ratio of the image compositing area are identical, then margins will be eliminated, even though the common portion 64 is pasted in the image compositing area, by enlarging or reducing the size of the page. Therefore, if there is a page on which such image compositing areas 53 have been formed, then this page is substituted for the other. If there is no page on which image compositing areas having an aspect ratio identical with that of the common portion 64 have been formed, then the page that is substituted for the other is one on which has been formed image compositing areas having transverse widths closest to the transverse width of the common portion 64 and heights closest to the height of the common portion 64 from among image compositing areas having transverse widths equal to or greater than that of the common portion 64 and heights equal to or greater than that of the common portion 64.

With reference again to FIG. 4, the portion (superimposed image portion) 64 common to both the image compositing area 53A and zone 62 is displayed in the image compositing area 53A on the page 51A that has been substituted (step 29; see FIG. 9). It goes without saying that in a case where the layout of the substituted page 51 is the same as that of the page 51A before the substitution, the common portion 64 will be displayed in the image compositing area 53A at the position corresponding to the image compositing area 53 in which the user was intending to paste the stereoscopic image.

If the adjustment of amount of parallax is not finished ("NO" at step 30), processing from step 23 onward is repeated.

If a command for reducing the amount of parallax is applied (step 24), then processing for reducing the amount of parallax is executed (step 31).

Figure 10:
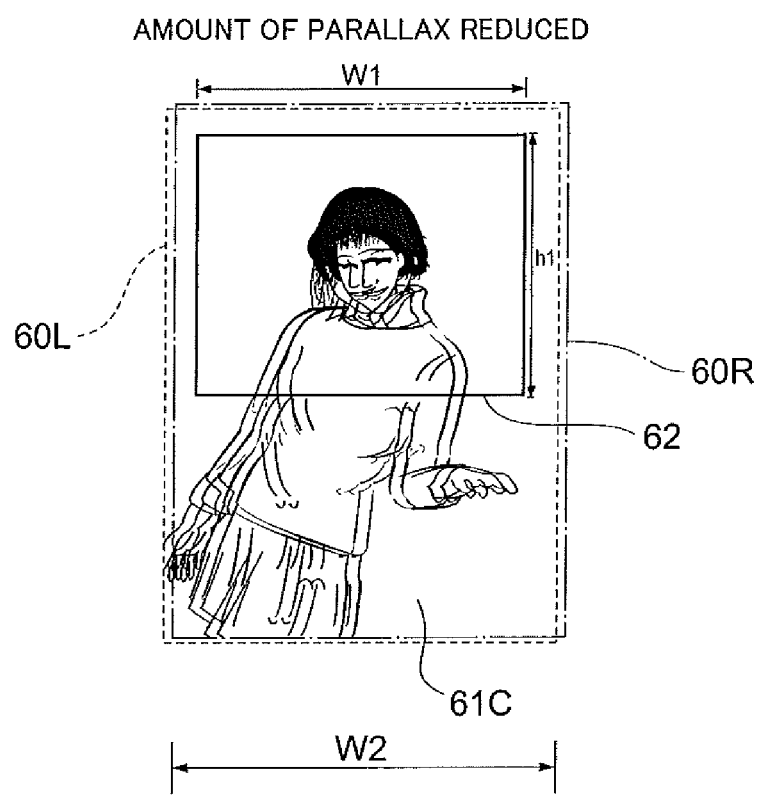
FIG. 10 illustrates the manner in which amount of parallax is reduced.

FIG. 10 is an example of a stereoscopic image that has undergone processing for reducing amount of parallax.

When processing for reducing amount of parallax is executed, the left-eye image 60L and right-eye image 60R approach each other in the horizontal direction. Since the transverse width w2 of an image portion 61C where the left-eye image 60L and right-eye image 60R are superposed is greater than the transverse width w1 of the image compositing area 53, margins will not be produced in the image compositing area 53.

Consequently, the image within the zone 62 contained in the superimposed image portion 61C is displayed in the image compositing area 53.

According to the embodiment described above, if margins will be produced in an image compositing area by enlarging the parallax of a stereoscopic image, then a page on which an image compositing area has been formed which will not result in the creation of margins is substituted. This makes it possible to prevent margins from being produced in the image compositing area.

Figure 11:
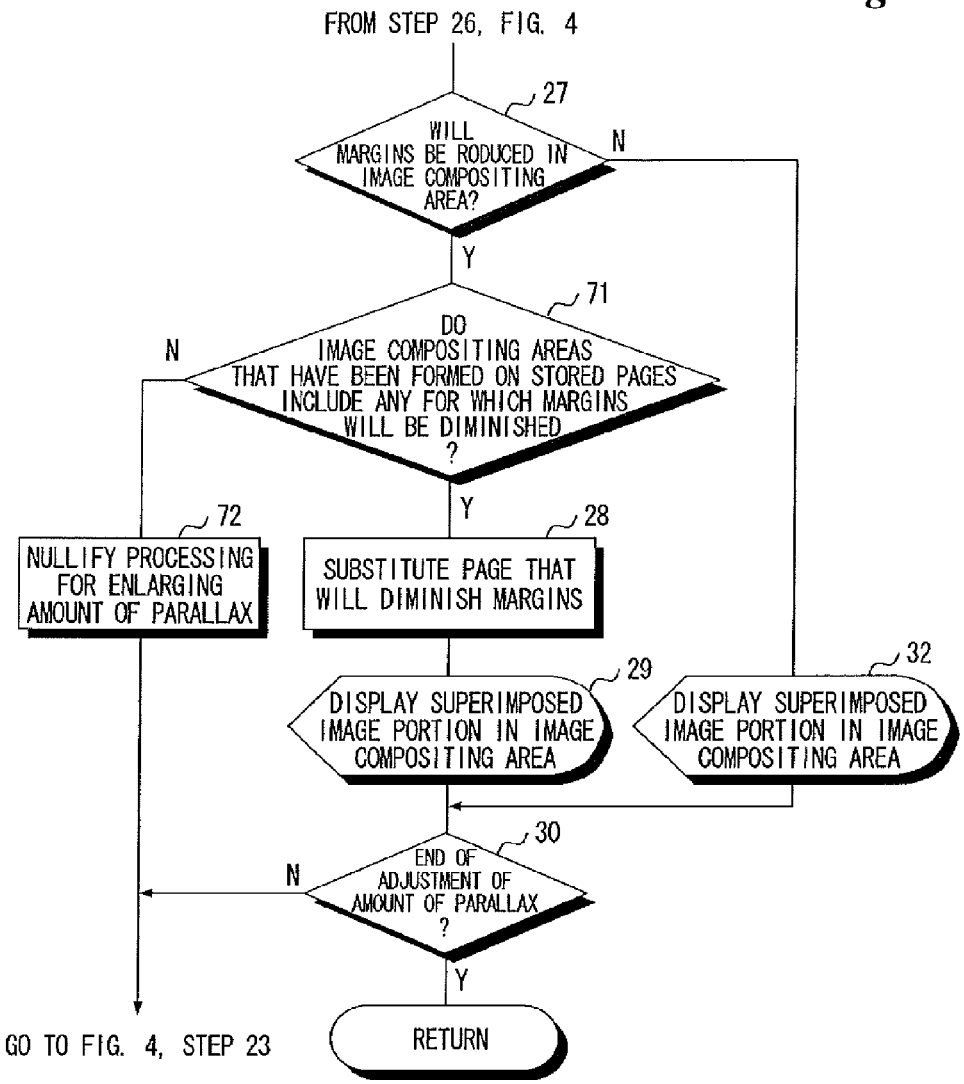
FIG. 11 is a flowchart illustrating a portion of processing for generating an electronic album.

FIG. 11, which shows another embodiment, is a flowchart illustrating a portion of processing for generating an electronic album. Processing steps in FIG. 11 identical with those shown in FIG. 4 are designated by like step numbers and need not be described again.

The processing illustrated in FIG. 11 allows parallax to be enlarged up to an amount which will not produce margins (or which diminish margins) in an image compositing area that has been formed in the image of a stored page.

If margins will be produced in the image compositing area 53 on the selected page 52 by displaying a stereoscopic image in this image compositing area 53 and enlarging the amount of parallax of this stereoscopic image ("YES" at step 27), as illustrated in FIG. 3, then it is determined whether image compositing areas that have been formed on stored pages include any for which the margins will be diminished (step 71). For example, if there is an image compositing area having a height equal to or greater than the height h1 of the image compositing area 53 and having also a transverse width equal to or greater than the transverse width w1 of the image compositing area 53 and the transverse width w2 of the common portion 64, then a page on which has been formed an image compositing area for which the margins will be diminished is determined to exist.

If the image compositing areas that have been formed on stored pages include one for which the margins will be diminished ("YES" at step 71), then the page on which this image compositing area 53 that will result in diminished margins has been formed is substituted (step 28).

If the image compositing areas that have been formed on stored pages do not include one for which the margins will be diminished ("NO" at step 71), then the parallax-amount enlargement processing executed in response to application of the parallax-amount enlarging command is nullified (step 72). The stereoscopic image that prevailed before the enlargement of amount of parallax is displayed in the image compositing area 53. Enlargement of the amount of parallax is allowed if margins will be reduced.

In the embodiment described above, processing that will not result in margins being produced in the image compositing area 53 is executed. Whether or not this processing is applied may be decided in accordance with the layout of the image compositing areas 53 in the image of the page constituting the electronic album (the image compositing areas 53 may be formed on a single mounting sheet without necessarily constructing an electronic album). For example, it may be so arranged that if there are a plurality of identically shaped rectangular image compositing areas on a page constituting an electronic album and the left and right side edges of the image compositing areas in the same column are aligned as well as the upper and lower edges of the image compositing areas in the same row, then processing that will not result in margins being produced in the image compositing areas is executed in the manner set forth above.

Further, in a case where there is a limitation upon the range over which the amount of parallax can be adjusted, it may be so arranged that the page decided upon is one on which has been formed an image compositing area that will not produce margins within these limits. Furthermore, although the image of the page is decided from among pages that have been stored in advance, it may be so arranged that when the aspect ratio of the common portion 64 is read, as described above, the image of a page on which has been formed an image compositing area having this aspect ratio is generated. In such case it is preferred that the image layout of the generated page be the same as that of the page on which would be formed the image compositing area in which margins would be produced by pasting the stereoscopic image.

Described in the foregoing embodiment is an electronic album composed of the images 52, 52A, etc., of pages on which the image compositing areas 53, 53A, etc., have been defined. However, it goes without saying that the present invention is not limited to an electronic album and is applicable also to a slideshow in which the image compositing areas have been formed in respective images (templates). Further, such images (templates) need not necessarily be plural in number.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic image display control apparatus comprising:
    a first display control device for controlling a display unit so as to display a first superimposed image portion, which is obtained by superimposing a left-eye image and a right-eye image that constitute a stereoscopic image, in a first image compositing area that has been formed in a first template image;
    a parallax-amount enlarging device for enlarging a parallax amount, which is amount of horizontal offset between the left- and right-eye images, in response to a parallax-amount enlarging command;
    a margin determination device for determining whether margins will be produced in the first image compositing area in response to enlargement of the parallax amount by said parallax-amount enlarging device;
    a substituting device for substituting a second template image, in which has been formed a second image compositing area that will not produce margins, for the first template image in response to a determination by said margin determination device that margins will be produced; and
    a second display control device for controlling the display unit so as to display a second superimposed image portion, which is obtained by superimposing the left-eye image and the right-eye image having the parallax amount that has been enlarged by said parallax-amount enlarging device, in the second image compositing area of the second template image that has been substituted for the first template image by said substituting device.

2. The apparatus according to claim 1, wherein the layout of the second template image that has been substituted for the first template image by said substituting device is the same as that of the first template image.

3. The apparatus according to claim 2, wherein in a case where a plurality of the first image compositing areas have been formed in the first template image, the second image compositing areas that have been formed in the second template image are plural in number and the number is the same as that of the first image compositing areas; and
    under the control of said first display control device, the second superimposed image portion is displayed in the second image compositing area that corresponds to the first image compositing area in which the first superimposed image portion is displayed.

4. The apparatus according to claim 1, wherein said margin determination device determines that margins will be produced in a case where the transverse width of the first image compositing area is greater than that of the second superimposed image portion.

5. The apparatus according to claim 1, wherein the left-eye image, the right-eye image, the first image compositing area and the second image compositing area are all rectangular; and
    aspect ratio of a portion common to both the second superimposed image portion and first image compositing area is the same as that of the second image compositing area.

6. The apparatus according to claim 1, further comprising a template image data storage device for storing template image data representing a number of template images in which image compositing areas have been formed;
    wherein said parallax-amount enlarging device allows enlargement of parallax amount that will not produce margins in an image compositing area that has been formed in a template image represented by template image data that has been stored in said template image data storage device.

7. A method of controlling operation of a stereoscopic image display control apparatus, by a processor, comprising the steps of:

Controlling a display unit so as to display a first superimposed image portion, which is obtained by superimposing a left-eye image and a right-eye image that constitute a stereoscopic image, in a first image compositing area that has been formed in a first template image;

Enlarging a parallax amount, which is amount of horizontal offset between the left- and right-eye images, in response to a parallax-amount enlarging command;

Determining whether margins will be produced in the first image compositing area in response to enlargement of the parallax amount;

Substituting a second template image, in which has been formed a second image compositing area that will not produce margins, for the first template image in response to a determination that margins will be produced; and Controlling the display unit so as to display a second superimposed image portion, which is obtained by superimposing the left-eye image and the right-eye image having the parallax amount that has been enlarged, in the second image compositing area of the second template image that has been substituted for the first template image.

8. A non-transitory computer-readable medium for controlling a computer of a stereoscopic image display control apparatus so as to:

Control a display unit so as to display a first superimposed image portion, which is obtained by superimposing a left-eye image and a right-eye image that constitute a stereoscopic image, in a first image compositing area that has been formed in a first template image;

Enlarge a parallax amount, which is amount of horizontal offset between the left- and right-eye images, in response to a parallax-amount enlarging command;

Determine whether margins will be produced in the first image compositing area in response to enlargement of the parallax amount;

Substitute a second template image, in which has been formed a second image compositing area that will not produce margins, for the first template image in response to a determination that margins will be produced; and Control the display unit so as to display a second superimposed image portion, which is obtained by superimposing the left-eye image and the right-eye image having the parallax amount that has been enlarged, in the second image compositing area of the second template image that has been substituted for the first template image.

* * * * *